US 7,454,754 B2

Nov. 18, 2008

(12) United States Patent
Tajima

(10) Patent No.: US 7,454,754 B2
(45) Date of Patent: Nov. 18, 2008

(54) SYSTEM FOR PROVIDING RESOURCES BASED ON LICENSING CONTRACT WITH USER BY CORRECTING THE ERROR BETWEEN ESTIMATED EXECUTION TIME FROM THE HISTORY OF JOB EXECUTION

(75) Inventor: Akira Tajima, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 10/212,370

(22) Filed: Aug. 2, 2002

(65) Prior Publication Data

US 2007/0220520 A1 Sep. 20, 2007

(30) Foreign Application Priority Data

Aug. 6, 2001 (JP) ............................. 2001-237885

(51) Int. Cl.
G06F 9/46 (2006.01)
G06F 15/173 (2006.01)
G06F 15/16 (2006.01)

(52) U.S. Cl. ...................... 718/104; 718/100; 718/105; 709/226; 709/229

(58) Field of Classification Search ................. 718/100, 718/102, 103, 104, 101, 105; 709/203, 224, 709/226, 229, 231
See application file for complete search history.

(56) References Cited

U.S. PATENT DOCUMENTS

| | | | | |
|---|---|---|---|---|
| 5,774,668 A | * | 6/1998 | Choquier et al. ............ | 709/223 |
| 6,003,061 A | * | 12/1999 | Jones et al. .................. | 718/104 |
| 6,112,243 A | * | 8/2000 | Downs et al. ................ | 709/226 |
| 6,539,445 B1 | * | 3/2003 | Krum ........................... | 710/110 |
| 6,816,882 B1 | * | 11/2004 | Conner et al. ............... | 709/203 |
| 6,938,256 B2 | * | 8/2005 | Deng et al. .................. | 718/104 |
| 6,986,134 B1 | * | 1/2006 | Foster .......................... | 717/177 |
| 7,003,487 B1 | * | 2/2006 | Skirpa .......................... | 705/37 |
| 7,249,176 B1 | * | 7/2007 | Salas et al. ................... | 709/225 |
| 7,320,131 B1 | * | 1/2008 | O'Toole, Jr. ................. | 718/104 |

FOREIGN PATENT DOCUMENTS

JP PUPA-03171249 7/1991

(Continued)

OTHER PUBLICATIONS

Michael B, Jones, Daniela Royu, Marcel-CWilin Rosu ;CPU Reservations and Time Constraints: Efficient, Predictable Scheduling of Independent Activities; 1997 ACM, pp. 198-211.*

*Primary Examiner*—Meng-Ai An
*Assistant Examiner*—Abdullah Al Kawsar
(74) *Attorney, Agent, or Firm*—George A. Willinghan; August Law Group LLC

(57) ABSTRACT

A network system includes an application service provider (ASP) which is connected to the Internet and executes an application, and a CPU resource provider which is connected to the Internet and provides a processing service to a particular computational part (e.g., computation intensive part) of the application, wherein: when requesting a job from the CPU resource provider, the application service provider (ASP) sends information about estimated computation time of the job to the CPU resource provider via the Internet; and the CPU resource provider assigns the job by correcting this estimated computation time based on the estimated computation time sent from the application service provider (ASP).

5 Claims, 12 Drawing Sheets

FOREIGN PATENT DOCUMENTS

| | | |
|---|---|---|
| JP | PUPA-04213152 | 8/1992 |
| JP | PUPA 04-326434 | 11/1992 |
| JP | PUPA 07-129520 | 5/1995 |
| JP | PUPA 07-141305 | 6/1995 |
| JP | PUPA-07200496 | 8/1995 |
| JP | PUPA-08055091 | 2/1996 |
| JP | PUPA-09198354 | 7/1997 |
| JP | PUPA 09-282288 | 10/1997 |
| JP | PUPA 09-293057 | 11/1997 |
| JP | PUPA 11-259433 | 9/1999 |

\* cited by examiner

SYSTEM FOR PROVIDING RESOURCES BASED ON LICENSING CONTRACT WITH USER BY CORRECTING THE ERROR BETWEEN ESTIMATED EXECUTION TIME FROM THE HISTORY OF JOB EXECUTION

FIELD OF THE INVENTION

The present invention relates to a network system and the like which provide computation intensive processing services. More particularly, it relates to a network system and the like which provide services with guaranteed performance.

BACKGROUND ART

Recently, ASPs (Application Service Providers) have grown rapidly that lease applications such as business software for a designated period by providing them via the Internet in order to cut the total costs of building and operating a system drastically, reduce system development period, and so on. Users who outsource businesses to ASPs can do away with the need to purchase hardware or software for special applications, reduce maintenance costs, and even cut the number of full-time staff.

Computation intensive applications offered by ASPs include CAE (Computer Aided Engineering) which consists in employing a computer to aid product-development engineering such as strength analysis, thermal analysis, vibration analysis, etc. using a finite element method or boundary element method. Also, some ASPs handle financial engineering including financial affairs and accounting. Regarding server configurations, there are cases, for example, in which all processing is undertaken by an application server. With such configurations, it will be difficult to maintain or improve service levels because very heavy computation processes, if carried out, are likely to affect other interactive processes and make parallel computation difficult.

Some Web-based services which process time-consuming jobs such as optimization use a system which involves processing a submitted job and returning the results by mail. However, such services, which are provided free of charge for academic purposes, handle limited problem scales without guarantees for performance. On the other hand, large computer centers of public institutions such as universities provide parallel computers for use by the general public and operate them using resource management software. However, these facilities are intended for fairness and effective use of resources and billing for their use is based on total CPU time.

Regarding scheduling technologies for computational resources, mainstream techniques involve managing batch job queuing, adjusting some priorities, and assigning freed nodes to jobs. A background reason for this is the fact that most of current large-scale computer systems are composed of parallel systems. However, there are often secret paths which make it possible to receive service preferentially by deceiving algorithms. For example, there is a technique known as backfill, which allows a short job to cut in if there is any space temporarily in the node. This could allow a job, for example, to cut in for ten minutes and actually stay for an hour, as can happen in real life.

Published Unexamined Patent Application No. 7-141305 discloses a technique for improving the efficiency of processor utilization when a parallel computer is used simultaneously by an unspecified number of users.

In addition to existing users of high-performance computing such as scientists who use large computer centers and bio-related large companies which install large servers as their core competencies, there are potential users professionals who use heavy-duty processing such as Monte Carlo simulations or finite element methods for daily operations in financial, manufacturing, and other industries. However, such processing generally requires a large system, whose installation and maintenance involve heavy economic and technical burdens. Besides, as performance is increased to reduce computation time, idle time increases accordingly, resulting in reduced efficiency. Furthermore, depending on vendors or applications, inconvenience may occur that platforms is limited.

One solution to this problem is migration to the use of ASPs. On the part of applications vendors, they can specialize in algorithms, in which they have a competitive edge, using a fixed platform. At present, however, service quality is not ensured in terms of wait time and response, as described above. Besides, scheduling algorithms could be deceived, making it impossible to secure "fairness," which is important in making business work.

The present invention has been made to solve the above technical problems. One of its objects is to implement fair service with guaranteed performance in a system which provides processing services such as computation intensive Web services.

Another object is to improve the efficiency of resource utilization in such a system based on estimation of computation time while encouraging clients to make accurate and honest estimates by giving incentives.

SUMMARY OF THE INVENTION

To achieve the above objects, the present invention implements a fair licensing and billing scheme with emphasis placed on overall performance by asking clients to estimate computation time and making a provider manage client-specific profiles, analyze estimation accuracy, and use the results of analysis for service management, in a system which consists mainly of servers suitable for computation (parallel computation) and provides processing services such as computation intensive Web services to applications. In other words, by using client profiles, the present invention improves the accuracy of input data (=estimation of execution time) a problem common to many of existing batch scheduling systems. Also, it achieves efficient use of computer resources by using accuracy information for scheduling.

Thus, a network system to which the present invention is applied comprises a client such as an ASP (Application Service Provider) that is connected to a network and executes an application, and a CPU resource provider that is connected to the network and provides a processing service preferably to a particular computational part (e.g., computation intensive part) in the application, wherein: when requesting a job from the CPU resource provider, the client sends information about estimated computation time of the job to the CPU resource provider via the network; and the CPU resource provider modifies the estimated computation time and assigns the job based on the estimated computation time sent from the client.

Also, a CPU resource provider to which the present invention is applied comprises a profile storage unit which stores a profile of a client; a receiving unit which receives estimated computation time of a given job along with a job request made by the client; a correction unit which corrects the estimated computation time received by the receiving unit, based on the profile stored in the profile storage unit; and a job assigning unit which assigns jobs by performing resource scheduling based on the estimated computation time corrected by the correction unit.

Viewed from another angle, a CPU resource provider to which the present invention is applied comprises an execution time estimating unit which estimates the execution time of a job requested by a client; a node count determining unit which determines the number of nodes currently available for assignment; a first estimated end time determining unit which determines a first estimated end time of the job assuming that the job is executed immediately using the estimated execution time and the number of nodes determined by the first estimated end time determining unit; a second estimated end time determining unit which determines a second estimated end time of the job assuming that the job is executed upon completion of a particular job currently under execution; and an assigning unit which assigns the job by securing required nodes based on the first estimated end time and second estimated end time determined.

In this case, preferably the first estimated end time determining unit and the second estimated end time determining unit determine the first estimated end time and the second estimated end time using a time scale (e.g., L value) which indicates the time required for the job to end with a predetermined probability of, for example, 90% and the assigning unit judges, by comparing values of the common time scale, whether to wait for a job currently under execution to end, because this will make it possible to incorporate differences in estimation accuracy among clients into scheduling.

Also, the present invention can be viewed as a client apparatus which executes an application and receives a service from a CPU resource provider connected to a network in relation to the application. The client apparatus comprises a job request transmission unit which transmits a job request to the CPU resource provider; a computation time estimating unit which estimates computation time based on the magnitude of the job in the job request transmitted; and an estimated computation time transmission unit which transmits the estimated computation time to the CPU resource provider along with the job request transmitted by the job request transmission unit. The job request transmission unit here may be configured to transmit data needed to execute the job for which the job request is transmitted, the number of executing nodes, application program code depending on circumstances, and parallelized performance if parallel execution is possible.

Also, the present invention can be viewed as a processing service providing method for providing a processing service to an application, based on a request from a client that executes the application. Also, it can be viewed as programs which cause a processor which is a client computer or a CPU resource provider which is a service-providing computer to implement designated functions. These programs may be supplied in a storage medium such as a CD-ROM. Also, they may be supplied to computers by a program-transmission device via a network. Such a program-transmission device needs only to comprise a memory for storing the programs and program-transmission means for supplying the programs via a network.

DETAILED DESCRIPTION

Preferred embodiments of the present invention will be described in detail below with reference to the accompanying drawings.

Figure 1:
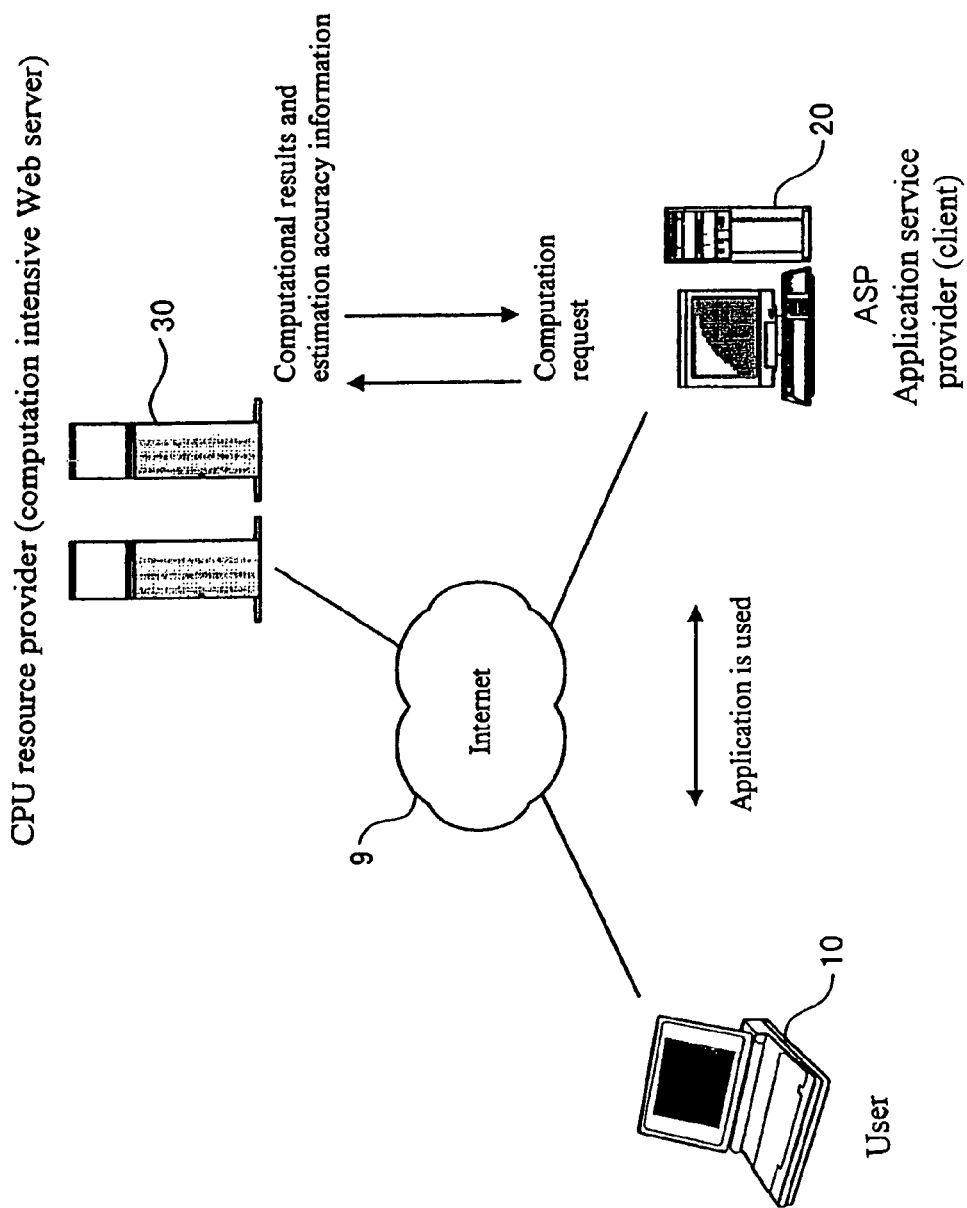
FIG. 1 is a diagram illustrating an overall configuration of a network system to which this embodiment is applied.

FIG. 1 is a diagram illustrating an overall configuration of a network system to which this embodiment is applied. A user 10 who is an end user of an application and an application service provider (ASP) 20 that is a client are connected to each other via the Internet 9 which is a network. Also, the application service provider 20 is connected with a CPU resource provider 30 which is a computation intensive Web server via the Internet 9.

The user 10 is a general application user. The CPU resource provider 30 is a provider of a processing service which specializes in a computation intensive part while the application service provider (ASP) 20 can be defined as a client that is a user of this processing service.

According to this embodiment, the CPU resource provider 30 obligates the application service provider (ASP) 20 that is a client to report estimated computation time when making a request. Also, it manages client profiles and maintains history of reported times, actual wait times, actual execution times, etc. Furthermore, based on the profiles, it:

(a) analyzes the accuracy of computation time estimation and trends (bias) in reporting and uses the results for resource scheduling;

(b) gives incentives such as lowering a price if an estimate is accurate for actions (accurate estimations or reservations by clients) that will help improve scheduling performance; and (c) maintains the service level during contract time by adjusting priorities in assignment and adjusting parallelism.

In this way, this embodiment further improves efficiency by enabling accurate estimation and encouraging clients to make accurate and honest estimates.

First, at the contracting stage, a licensing contract for a particular application is concluded between the user 10 and application service provider 20. Also, a computer resource licensing contract is concluded between the application service provider 20 and CPU resource provider 30. Then, the application service provider 20 registers programs to be used and parallelization characteristics with the CPU resource provider 30.

During operation, the application agreed upon under the licensing contract between the user 10 and application service provider 20 is used. The application service provider 20 presents a computation request including computation of estimated time to the CPU resource provider 30 and the CPU resource provider 30 presents computational results and estimation accuracy information to the application service provider 20.

Alternatively, it is possible for the user 10 to bypass the application service provider 20 and use the CPU resource provider 30 directly. In that case, an application installed in a client machine which is the user 10 is set to entrust only computation intensive analyses to the CPU resource provider 30 via the Internet 9. In such cases, since it is generally difficult for the user 10 that is a client to estimate computation time, a scale of several points which represents problem scale is used instead. Since history is accumulated and a function of computation time can be specified using the scale, computation time is estimated by the CPU resource provider 30. However, it is also possible to provide a program with a capability to estimate computation time to the user 10 and make the user 10 that is a client to estimate computation time.

Figure 2:
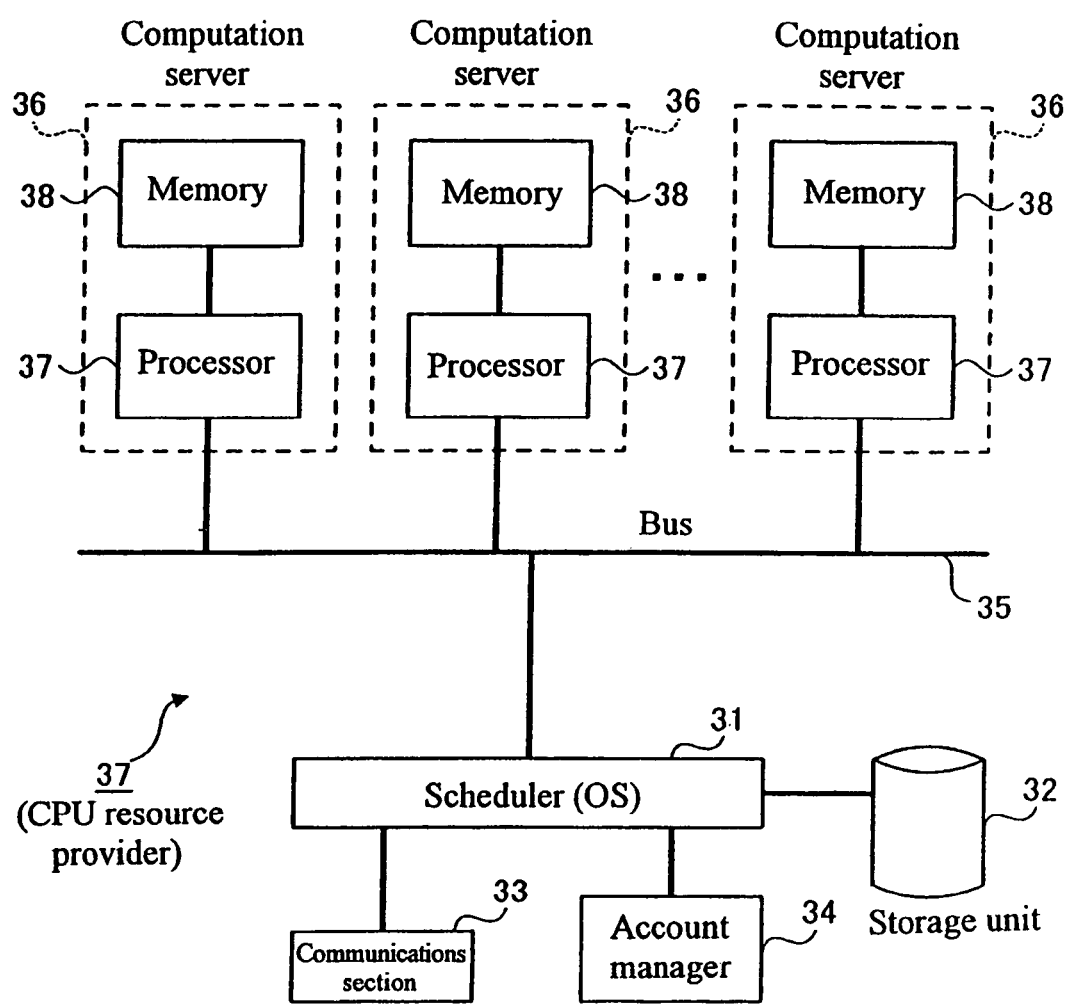
FIG. 2 is a diagram showing a configuration of a CPU resource provider.

FIG. 2 is a diagram showing a configuration of the CPU resource provider 30. The CPU resource provider 30 according to this embodiment acts as a computation intensive Web server. It comprises a server group consisting of a plurality of computation servers 36 and is connected with them via a bus 35. Also, on a front end processor connected to the bus 35, the CPU resource provider 30 is equipped with a scheduler 31, an OS which manages jobs for the plurality of computation servers 36. It also comprises a storage unit 32 for storing profiles and the like of the application service provider 20 that is a client, a communications section 33 for communicating with the application service provider 20, and an account manager 34 for account computation.

Figure 12:
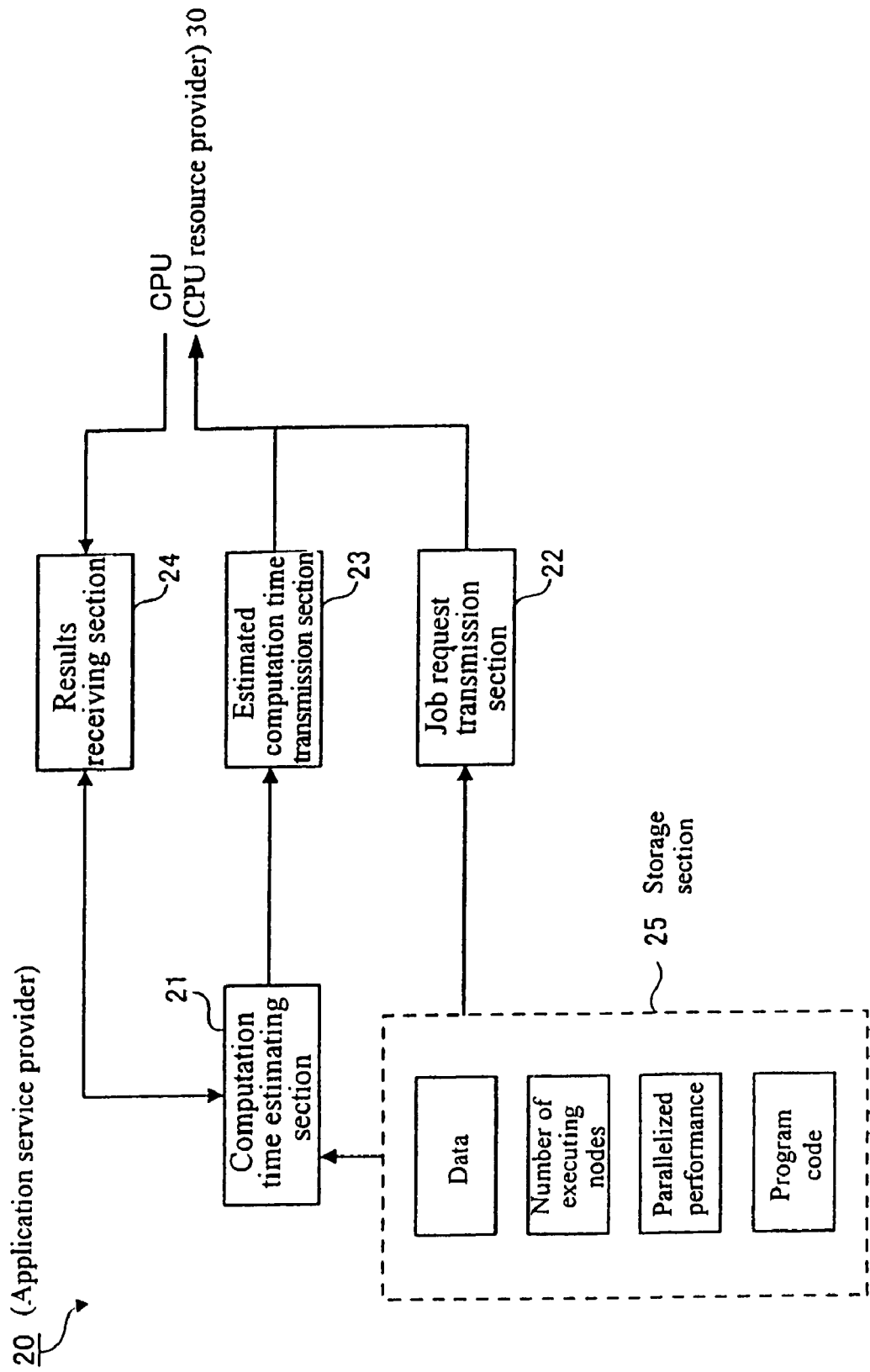
FIG. 12 is a diagram showing a configuration of an application service provider.

FIG. 12 is a diagram showing a configuration of that part of the application service provider 20 which is used in relation to the CPU resource provider 30. The application service provider 20 here comprises a storage section 25 for storing data about applications used in relation to the user 10, the number of executing nodes, parallelized performance, program code, etc. as well as a computation time estimating section 21 for estimating computation time based on problem scale when requesting a job from the CPU resource provider 30. Also, it comprises a job request transmission section 22 for transmitting the data necessary for execution and the number of executing nodes stored in the storage section 25 to the CPU resource provider 30, an estimated computation time transmission section 23 for transmitting the computation time estimated by the computation time estimating section 21 to the CPU resource provider 30. Furthermore, it comprises a results receiving section 24 for receiving the actual execution time required for a job from the CPU resource provider 30 together with computational results produced by the execution of the job. The actual execution time received by the results receiving section 24 is input in the computation time estimating section 21 and used to improve the accuracy of estimation for the next job.

Next, description will be given about how a service level is set and information about estimated time is managed by the scheduler 31 of the CPU resource provider 30. This embodiment includes examples which concern a method for setting a service level with respect to a client, management of estimation error information, and a scheduling algorithm based on them. There can be a flood of requests for which sufficient resources are not available, and thus it is generally impossible to always assure performance. However, this situation is dealt with by assuring a period average in terms of an index called a "deemed number of nodes" and changing a set point dynamically based on actual results. Also, by using a common scale known as an L value (which indicates the time required for a job to end with a high probability e.g., 90%), differences in estimation accuracy among clients are incorporated into scheduling.

Figure 3:
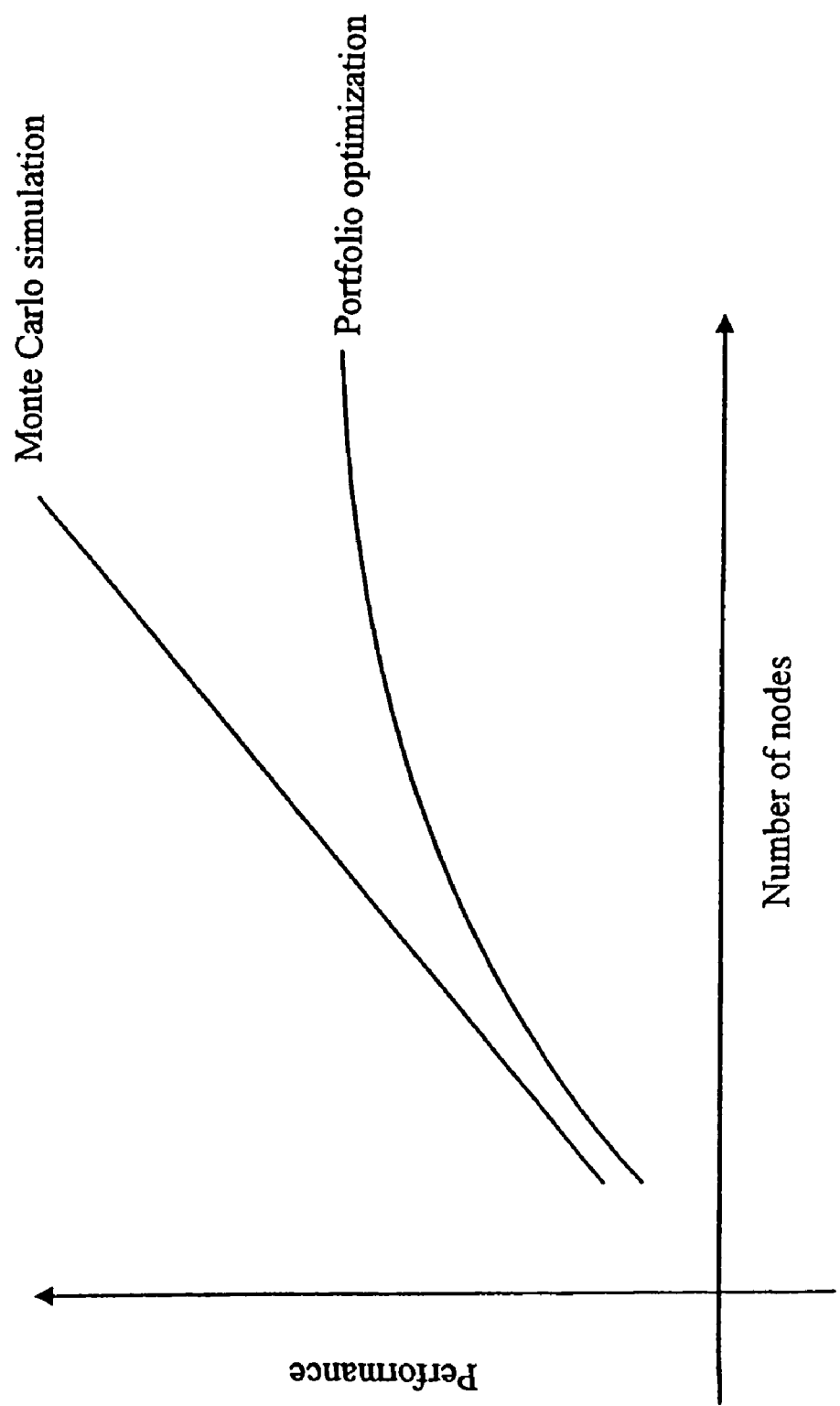
FIG. 3 is a diagram showing an example of parallelized performance for an application.

FIG. 3 shows an example of parallelized performance for an application. Such parallelized performance has been provided as prior information to the CPU resource provider 30 by a client of the application service provider 20. The figure, in which the horizontal axis represents the number of nodes and the vertical axis represents performance, shows results of a Monte Carlo simulation and portfolio optimization.

Preparation will be described first. The parallelized performance illustrated in FIG. 3 is provided as prior information by the client. This function is given, for example, by:

$$f_c(n)\{f_c(1)=1.0\} \qquad \text{[Equation 1]}$$

It is assumed here that a job which will take a single node ten hours is executed in parallel by a plurality of nodes after waiting some time for assignment and is completed in 3 hours after submission. This is expressed as follows:

$$\bar{n}=f_c^{-1}(10/3) \qquad \text{[Equation 2]}$$

The number of nodes required if nodes are assigned immediately upon submission is referred to as a "deemed number of nodes."

During the term of a contract, a service level for client c that is one of the application service providers 20 is set as follows:

$$\text{Average deemed number of nodes} = \bar{n}_c^{avg}, \text{Total CPU time} = t_c^{total} \qquad \text{[Equation 3]}$$

The "average deemed number of nodes" corresponds to the quality of service while the "total CPU time" corresponds to the amount of service. Deviations from these set points are reflected in charges.

Next, suppose the number of nodes and CPU time for each job executed at the request of client c during the term of a contract (e.g., in this month) is given by:

$$\bar{n}_c(i), t_c(i) \qquad \text{[Equation 4]}$$

Suppose also that future CPU usage estimated in some way or other is given by:

$$t_c^{rest} \text{ for example,} \left(t_c^{rest} = t_c^{total} - \sum_i t_c(i)\right) \qquad \text{[Equation 5]}$$

Then, a "target deemed number of nodes" for the client c is given by:

$$\bar{n}_c^{target} = \frac{\left(\sum_i t_c(i) + t_c^{rest}\right)\bar{n}_c^{avg} - \sum_i t_c(i)\bar{n}_c(i)}{t_c^{rest}} \qquad \text{[Equation 6]}$$

Its value is updated each time a job is finished.

Here, estimated execution time allowing for error is considered to have a probability distribution X. With respect to parameter P, an E value of X and an L value of X are given, respectively, by:

$$E_p(x)=\{x|\text{Prob}(x>X)=p\}$$

$$L_p(x)=\{x|\text{Prob}(x<X)=p\} \qquad \text{[Equation 7]}$$

For example, when P=0.1, X will end earlier than the L value with a probability of 90% and will take a longer time than the E value with a probability of 90%.

Furthermore, if it is assumed that X follows an independent normal distribution, the following formula can be used when handling a sum of distributions (i.e., total time required to execute a plurality of jobs in sequence).

$$X = N(\mu_x, \sigma_x^2)$$

$$Y = N(\mu_y, \sigma_y^2)$$

$$aX + bY = N(a\mu_x + b\mu_y, a^2\sigma_x^2 + b^2\sigma_x^2) \quad \text{[Equation 8]}$$

This can simplify computations in subsequent procedures.

Next, execution time is estimated assuming a large-scale parallel computation environment with a uniform capacity as is the case with the computation server 36 group shown in FIG. 2 and assuming that the number of nodes assigned to each job is variable. However, each client estimates computation time assuming that the jobs are executed serially on one node. If it is necessary to execute jobs on a fixed number of nodes $n^{fixed}$, the following equation can be used.

$$f_c(n) \Leftarrow \begin{cases} \varepsilon \ll 1 & n < n^{fixed} \\ f_c(n^{fixed}) & n \geq n^{fixed} \end{cases} \quad \text{[Equation 9]}$$

Figure 4:
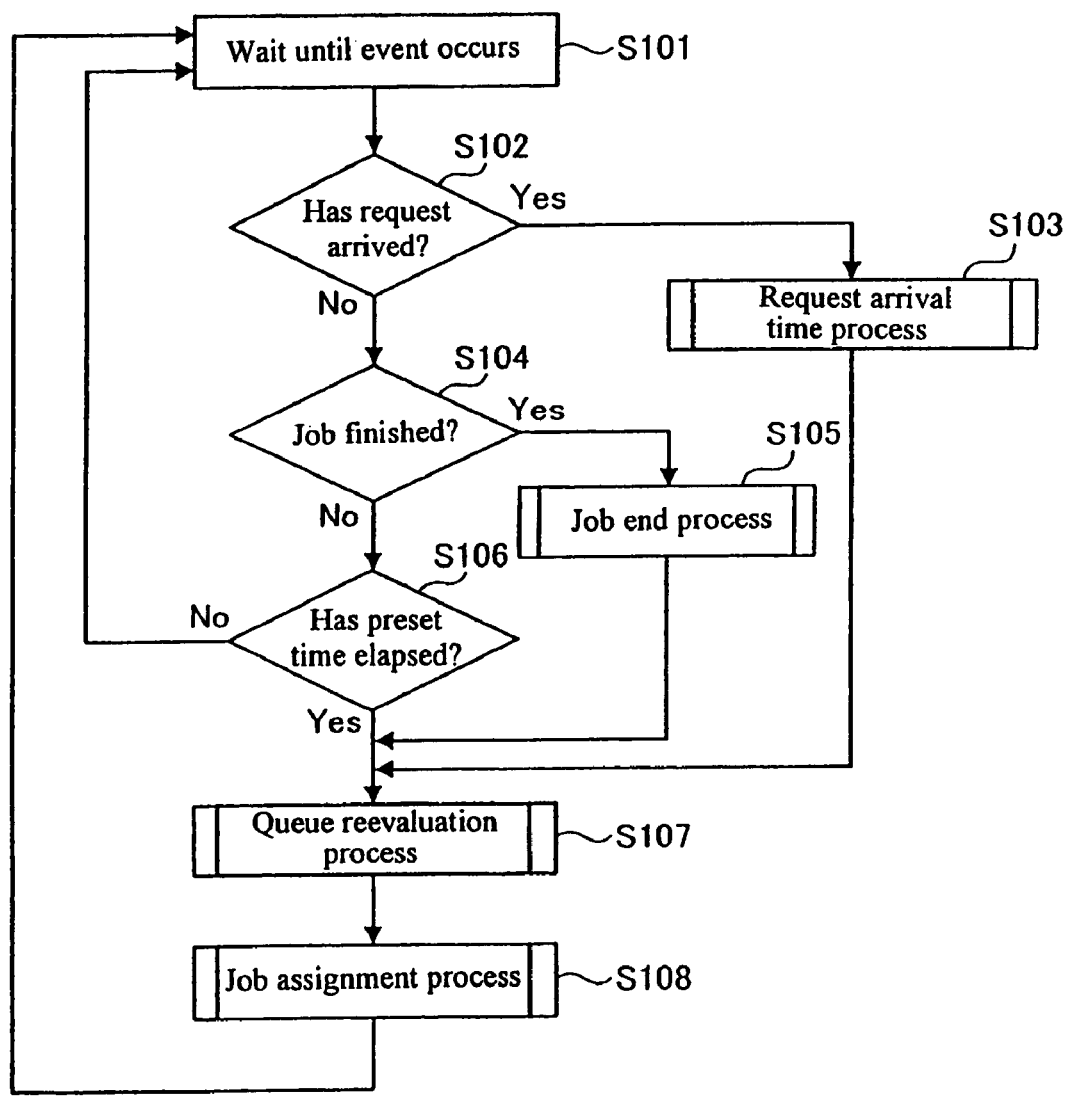
FIG. 4 is a flowchart showing a process flow of scheduling procedures.

Next, scheduling procedures performed by the scheduler 31 will be described. FIG. 4 is a flowchart showing a process flow of scheduling procedures. First, the scheduler 31 waits for a specific event to occur (Step 101). When a request arrives (Step 102), the scheduler 31 performs a request arrival time process (Step 103) and goes to a queue reevaluation process in Step 107. If no request arrival event occurs, the scheduler 31 judges whether a job is finished (Step 104). If a job end event occurs, the scheduler 31 performs a job end process (Step 105) and goes to the queue reevaluation process in Step 107. If no job end event occurs in Step 104 the scheduler 31 judges whether a preset time has elapsed (Step 106). If the preset time has not elapsed, the scheduler 31 waits for an event to occur in Step 101. If the preset time has elapsed, the scheduler 31 performs the queue reevaluation process (Step 107) and goes to a job assignment process in Step 108. After performing the job assignment process (Step 108), the scheduler 31 returns to Step 101 and waits there until a next event occurs.

Now, the request arrival time process will be described.

Figure 5:
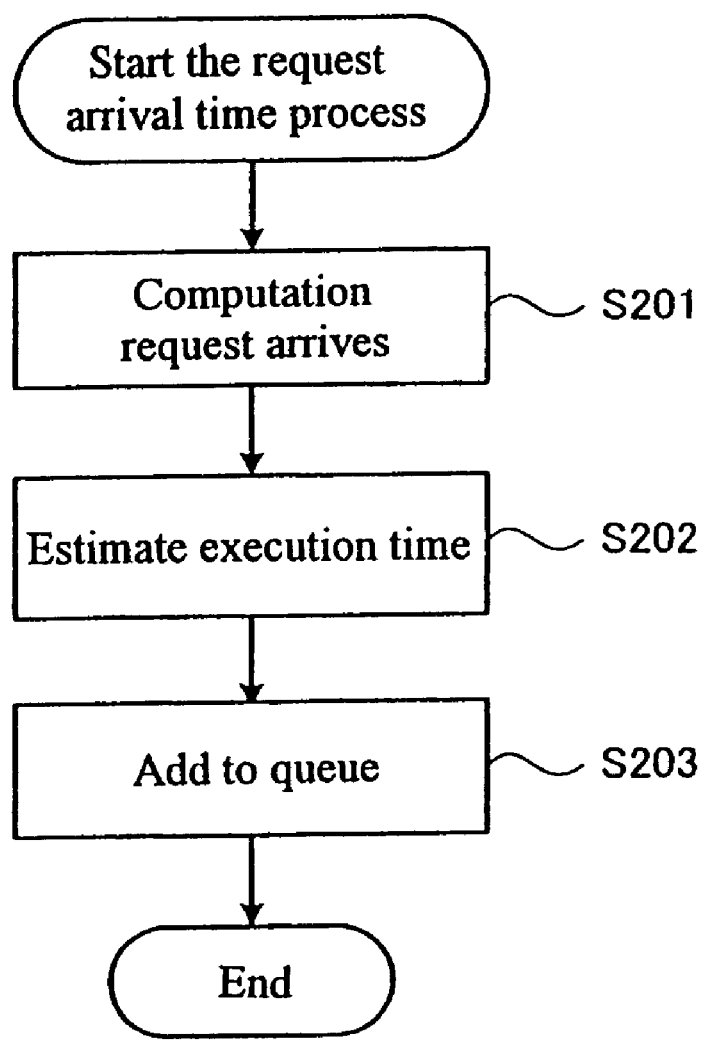
FIG. 5 is a flowchart showing a request arrival time process in Step 103 of FIG. 4.

FIG. 5 is a flowchart showing the request arrival time process in Step 103 of FIG. 4. Upon arrival of a computation request (Step 201), the scheduler 31 estimates execution time (Step 202) based on trends in estimations made by the requesting client (application service provider 20). The estimated execution time is added to the queue (Step 203). When the request arrives, the time when the requested job i arrives from client c(i) is denoted by $T_i^{arrival}$. Estimated execution time $t_i$ reported by the client is corrected based on error analysis of past history and distribution $X_i$ of estimated execution times is determined assuming that $E[X_i] = m_i$.

Figure 6:
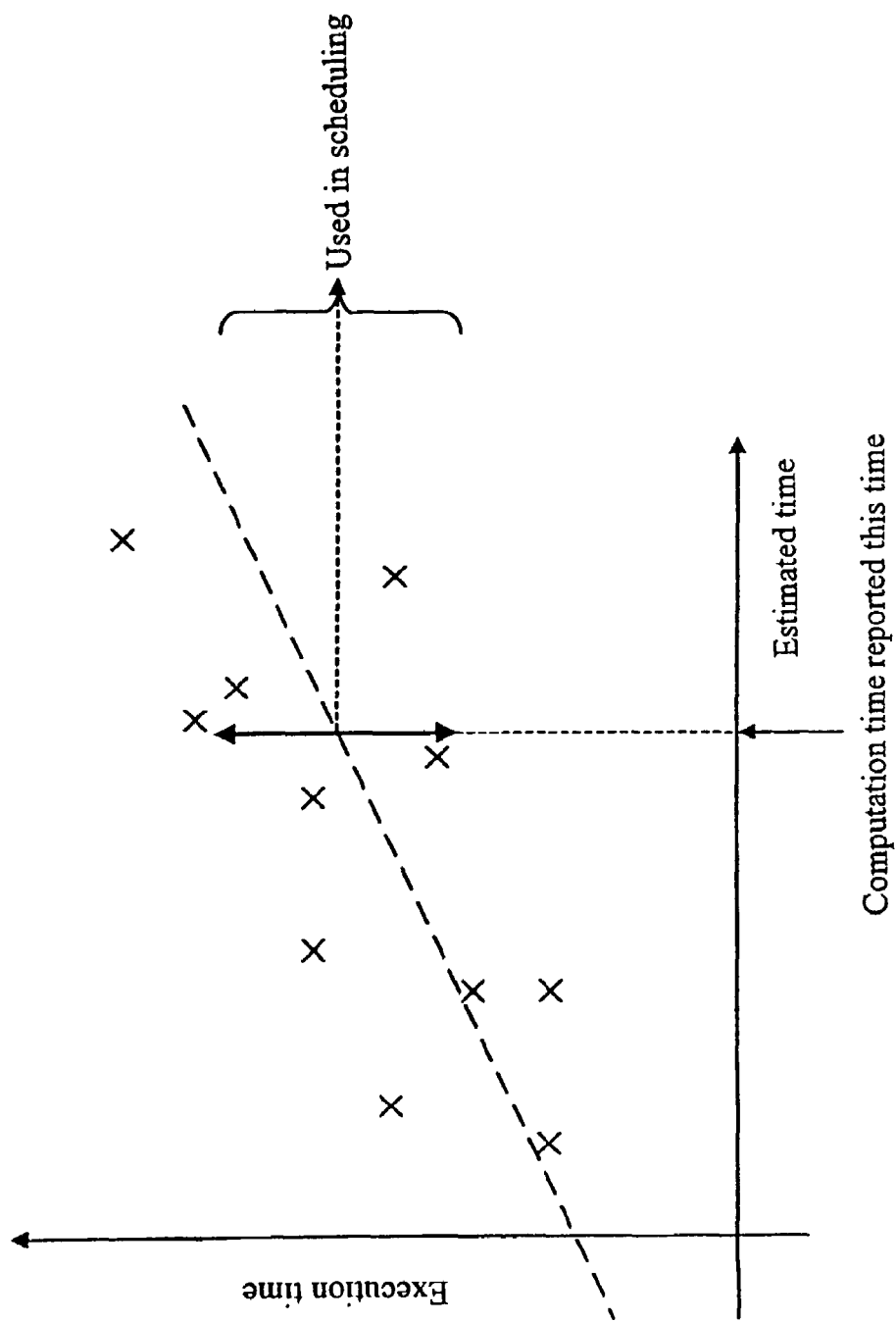
FIG. 6 is a diagram showing trends in estimations made by a client.

FIG. 6 shows trends in estimations made by a client. In the figure, the horizontal axis represents estimated time while the vertical axis represents actual execution time. The errors are analyzed and distribution of estimated times is determined, and then the results are used for scheduling. Parallelism is omitted for the sake of simplicity. As shown in FIG. 6, the actual execution time deviates from the estimated time reported by the application service provider 20 that is a client, by a certain amount as indicated by a thick arrow. Thus, a bias which exists as trends in estimations made by the client is determined and corrected when a request arrives: this is a characteristic feature of this embodiment.

It can be seen from past history that the client shown in the example of FIG. 6 has a tendency toward underestimation. Also, error variance can be quantified. For example, if it is estimated from a reported computation time of 80 minutes that the expected value and standard deviation are 90 minutes and 30 minutes, respectively, risk of error can be reduced by using the following value as estimated execution time in scheduling:

90=30×0.4=102 minutes

It is also possible to use error information more elaborately.

Analytical applications often run a number of iterations by changing parameters bit by bit. Suppose there are ten successive requests each scheduled to take 30 minutes. If the first two jobs actually take 40 minutes each, it is highly likely that the remaining eight jobs will also take 40 minutes each. In such cases, estimates can be corrected by performing time series analysis (in this case, +10, +10>?, ?, . . . ) on the bias in the reported values.

Next, the job end process will be described.

Figure 7:
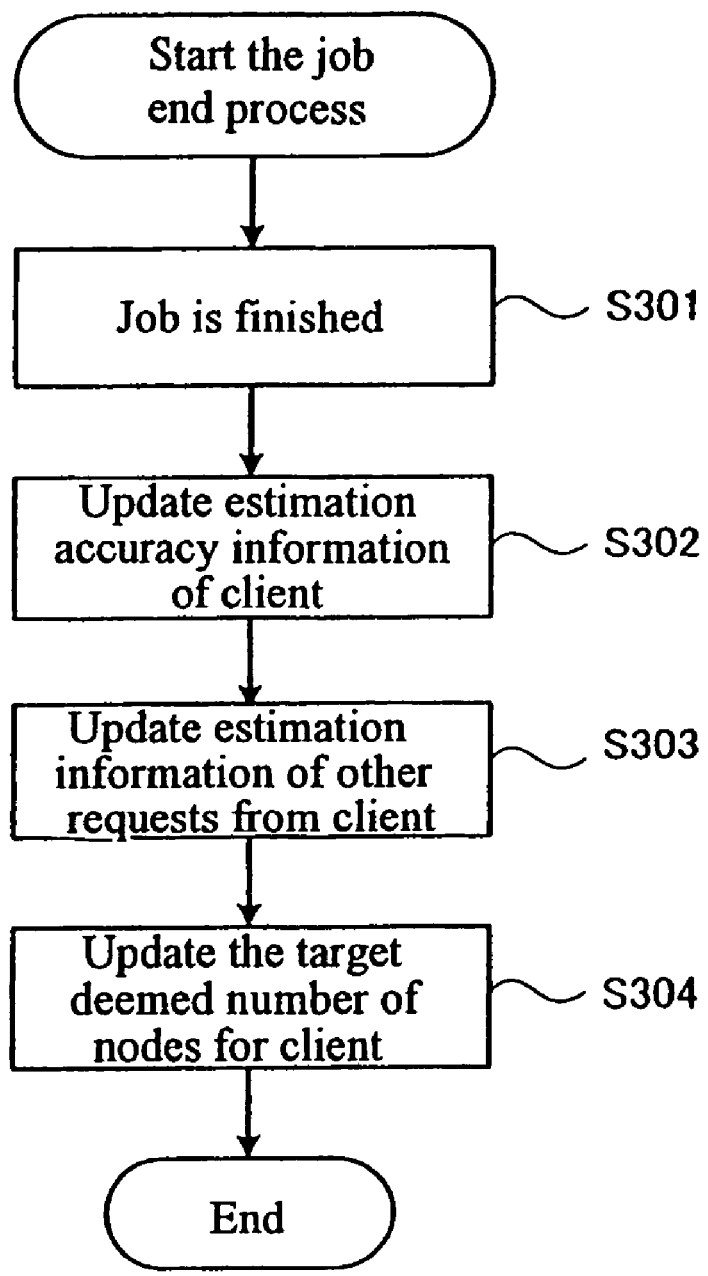
FIG. 7 is a flowchart showing a job end process in Step 105 of FIG. 4.

FIG. 7 is a flowchart showing the job end process in Step 105 of FIG. 4. When a job end event occurs (Step 301), the scheduler 31 updates the history, error information, and other estimation accuracy information of client c(i) (Step 302) based on the actual execution time of job i. If client c(i) has requested another job as well, the estimation information of that job is also updated (Step 303). Also, the scheduler 31 updates the target deemed number of nodes for client c(i) given by the following equation and reevaluates the queue based on it (Step 304).

$$\bar{n}_{c(i)}^{target} \quad \text{[Equation 10]}$$

Next, queue management will be described.

Figure 8:
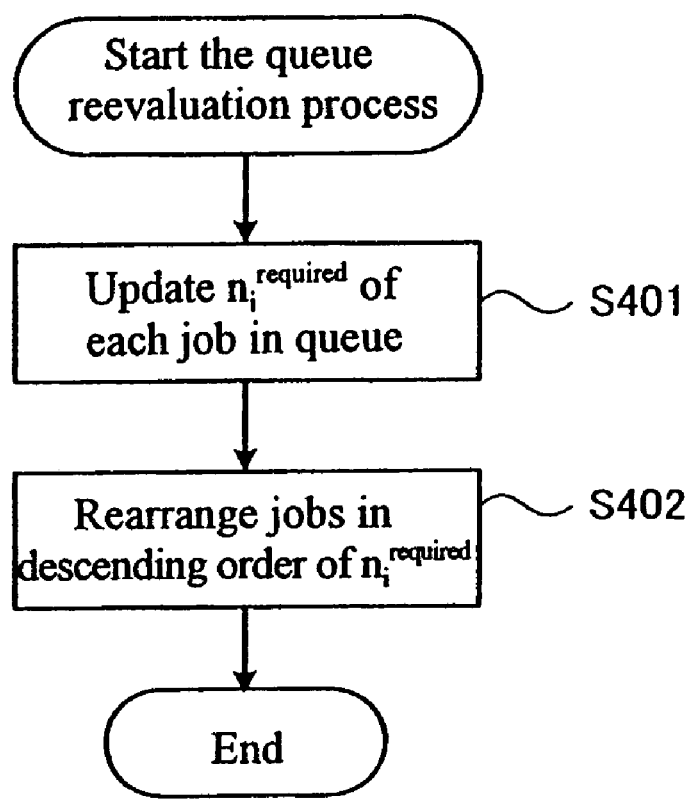
FIG. 8 is a flowchart showing a queue reevaluation process in Step 107 of FIG. 4.

FIG. 8 is a flowchart showing the queue reevaluation process in Step 107 of FIG. 4. First, the scheduler 31 updates $n_i^{required}$ of each job in the queue (Step 401). Jobs not yet assigned to computers are sorted and rearranged in descending order of $n_i^{required}$ given by the following equation, where $T^{current}$ denotes the present time (Step 402).

$$\bar{n}_i^{required} = \quad \text{[Equation 11]}$$

$$f_{c(i)}^{-1}\left( \frac{f_{c(i)}(\bar{n}_{c(i)}^{target})\mu_i}{f_{c(i)}(\bar{n}_{c(i)}^{target})\mu_i - (T^{current} - T_i^{arrival})} \times f_{c(i)}(\bar{n}_{c(i)}^{target}) \right)$$

Although jobs are often sorted in order of arrival in existing batch systems, the number of nodes $n_i^{required}$ needed to achieve the "deemed number of nodes" is used here on the assumption that jobs are assigned immediately. Since this value changes with time, it must be updated periodically. After the reevaluation process, the next job assignment process is started, with the ID of the k-th job after sorting set to q(k).

Next, job assignment will be described.

Figure 9:
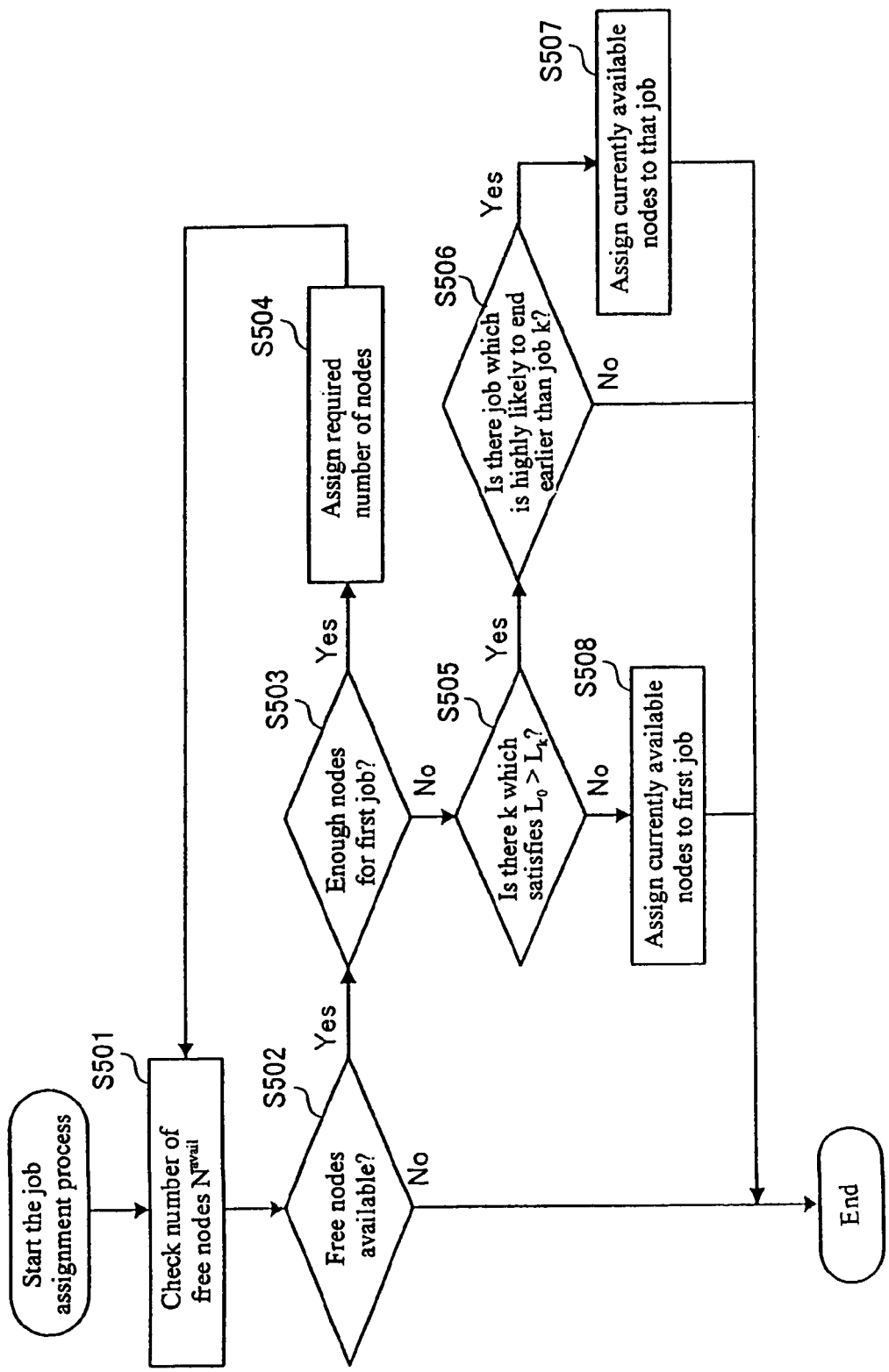
FIG. 9 is a flowchart showing a job assignment process in Step 108 of FIG. 4.

FIG. 9 is a flowchart showing the job assignment process in Step 108 of FIG. 4. In the job assignment process, the number of nodes currently available for assignment is denoted by $N^{avail}$, the number of nodes taken up by the job which has the k-th smallest L value out of the jobs currently under execution is denoted by $N_k^{avail}$, and the ID of that job is denoted by a(k). First, the scheduler 31 checks the number of nodes currently available for assignment, i.e., the number of free nodes $N^{avail}$ (Step 501). Then, it checks for free nodes (Step 502). If there is no free node, i.e., $N^{avail} = 0$, the job assignment process is finished and the scheduler 31 waits for a running job to end.

If free nodes are available, the scheduler 31 judges whether there are enough nodes for the first job (Step 503). If there are enough nodes, i.e., if the following equation is satisfied, $$N^{avail} \geq |n_{q(1)}^{required}| \quad \text{[Equation 12]}$$

the scheduler 31 assigns job q(1) to:

$$|n_{q(1)}^{required}| \text{nodes} \quad \text{[Equation 13]}$$

so that the number of remaining nodes after assignment will be (Step 504):

$$N^{avail} = N^{avail} - |n_{q(1)}^{required}| \quad \text{[Equation 14]}$$

and the scheduler 31 returns to Step 501.

The L value which results when job q(1) is executed immediately on $N^{avail}$ nodes is denoted by $L_0$ and the L value which results when job q(1) is executed on $N^{avail} + N_1^{avail}$ nodes after job a(1) is finished is denoted by $L_1$. Also, the L value which results when job q(1) is executed on the following number of nodes after job a(k) is finished is denoted by $L_k$ $$N^{avail} + \sum_j^k N_j^{avail} \text{nodes} \quad \text{[Equation 15]}$$

If enough nodes are not available for the first job in Step 503, i.e., if the equation shown below holds, the scheduler 31 judges whether there is k which satisfies $L_0 > L_k$ (Step 505).

$$N^{avail} < |n_{q(1)}^{required}| \quad \text{[Equation 16]}$$

If k which satisfies $L_0 > L_k$ exists, it is advisable to assign job q(k) after job a(k) is finished. Thus, the scheduler 31 checks whether there is a job which is highly likely to end earlier than job k (Step 506). If there is, the scheduler 31 assigns currently available nodes to that job (Step 507) and finishes the process. That is, beginning with the top of the queue, the scheduler 31 checks for a job which will give an L value smaller than the L value of job a(k) executed on $N^{avail}$ nodes, and if there is such a job, the scheduler 31 assigns the $N^{avail}$ nodes to that job and finishes the process. If there is no appropriate job in Step 506, the scheduler 31 waits until any of the assigned job is finished.

If it is found in Step 505 that any k satisfies $L_0 £ L_k$, the first job q(1) is assigned to currently available $N^{avail}$ nodes (Step 508) and the process is finished.

Figure 10:
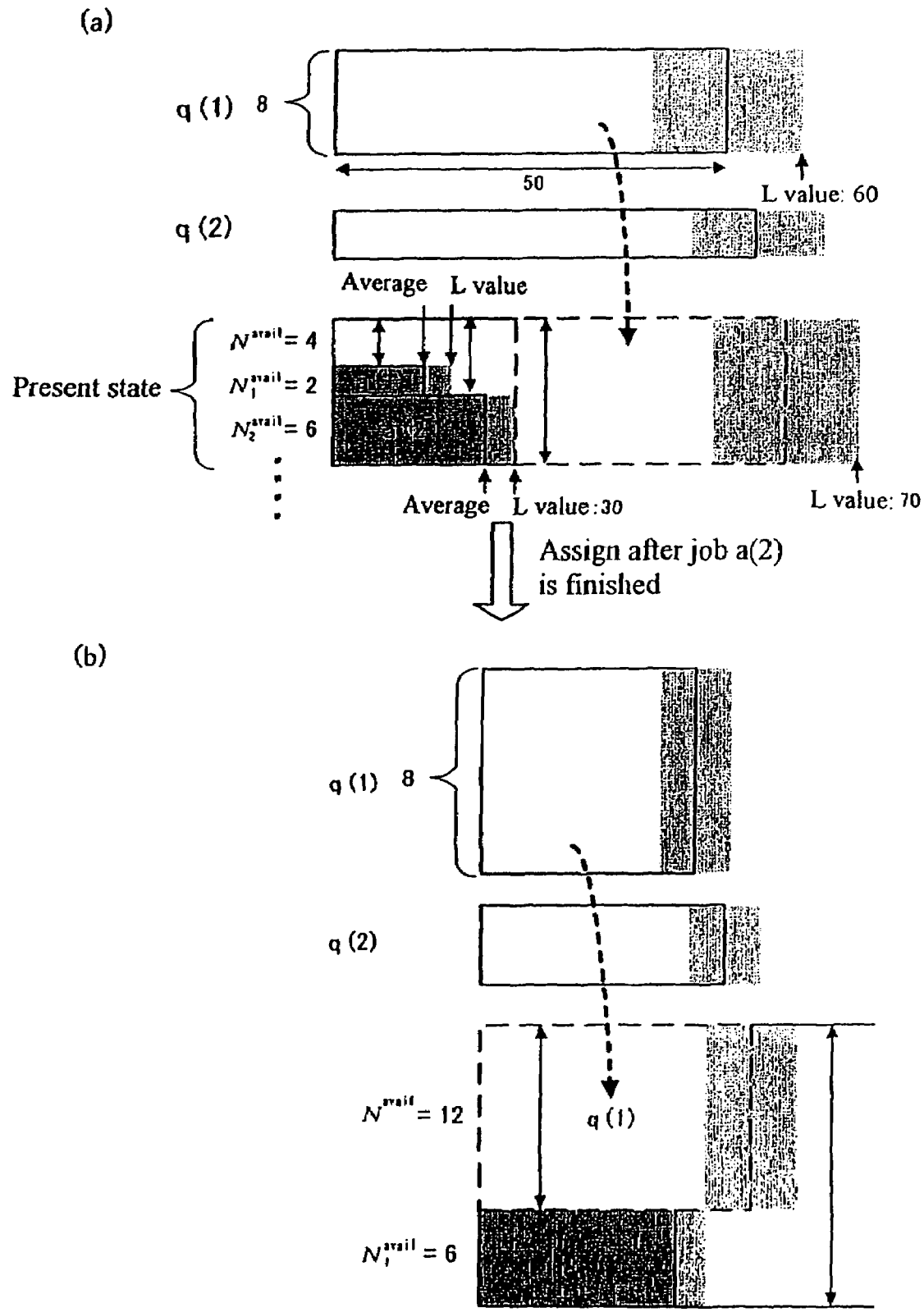
FIGS. 10A and 10B are diagrams showing an example of a job assignment process.

FIGS. 10A and 10B show an example of the job assignment process described above. FIG. 10A shows the present state before the assignment process. FIG. 10B shows an example of the assignment process. As shown in FIG. 10A, four nodes are currently available for use. There are a first job q(1) and second job q(2) in a queue, and a method for assigning the first job q(1) will be described here. Specifically, job q(1) at the top of the queue needs eight nodes in terms of the target deemed number and is considered to take approximately 50 minutes (the L value is 60), but only four free nodes are available. In FIG. 10A, the jobs currently under execution are considered in descending order of likelihood to be completed (beginning with the job with the smallest L value). Of the jobs currently under execution, only job a(1) with the smallest L value and job a(2) with the second smallest L value are shown, and the other jobs are omitted. The number of nodes $N_1^{avail}$ taken up by job a(1) is two and the number of nodes $N_2^{avail}$ taken up by job a(2) is six.

In FIG. 10A, the average values (indicated by solid lines) and L values are shown for both jobs a(1) and a(2). In executing the first job q(1) in the queue, it is determined here whether to execute it right now by assigning the currently available four nodes, to execute it using six (4+2) nodes after finishing job a(1), or to execute it using twelve (4+2+6) nodes after finishing job a(2).

It is assumed that the L value will be 120 if the first job q(1) in the queue is executed immediately using four nodes, that the L value will be 110 if job q(1) is executed using six nodes after job a(1) is finished, and that the L value will be 70 if job q(1) is executed using twelve nodes after job a(2) is finished. Since the L value is the smallest if job q(1) is executed after job a(2) is finished, job q(1) is made to wait until that time. If there is a job which, if executed immediately using four nodes, will require an L value small than 30, i.e., the L value of job a(2), it is executed out of turn by jumping the queue. However, there is no such job here and thus no job is executed out of turn.

As shown in FIG. 10B, it is assumed that when job a(2) is finished and twelve nodes become available, the deemed number of nodes has increased to 16 as a result of the wait although the top job q(1) in the queue remains as it was before. Then, in this example, deciding that no further improvement in the L value can be expected, this job q(1) is assigned using twelve nodes, as shown in FIG. 10B. In this way, this embodiment makes it possible to improve the efficiency of resource utilization based on accurate estimation of computation time.

Next, description will be given about an implementation example of a system to which this embodiment is applied. In this example, it is assumed that a financial applications vendor P has switched to an ASP business and become an application service provider 20 such as the one shown in FIG. 1. Application service providers use their own server groups for provision of information such as the latest market prices and transaction processing including online transactions. However, Monte Carlo simulations for derivatives pricing and portfolio optimization, which can take up a multiple CPUs for several minutes to several hours, may delay response in other interactive services. On the other hand, increased execution speed owing to large-scale parallelism will lead to improved customer satisfaction. Therefore, the CPU resource provider 30 will be used. The vendor P (the application service provider 20) registers program code necessary for execution of applications in a system of the CPU resource provider 30. If parallel execution is possible, the vendor P also informs the CPU resource provider 30 of parallelized performance as shown in FIG. 3.

If a user 10 of an application service offered by the vendor P (the application service provider 20) specifies a Monte Carlo method, the vendor P (the application service provider 20) sends data necessary for execution, the number of executing nodes, and computation time estimated based on problem scale to the CPU resource provider 30. The CPU resource provider 30 adds this request to a queue, executes it as soon as resources become available, and sends the results to the vendor P (the application service provider 20).

In addition to the vendor P, the CPU resource provider 30 provides computational services to a plurality of other clients application service providers 20 including, for example, a gene analysis applications vendor Q and a fluid analysis applications vendor R maintaining execution environments for respective applications.

When running a business of providing Web services which handle only computation intensive parts of applications, as is the case with the CPU resource provider 30 of this example, it is preferable to ensure a service level, taking into consideration not only total CPU time, but also turnaround time from the submission of a client's request to the end of computation. Assuming that an hour's execution on four nodes after an hour's wait is equivalent to occupancy of two nodes, this embodiment ensures the following service level: computation time equivalent to a total of one node, four nodes on average, and performance equivalent to two nodes or better with a probability of 90%.

Such improvement of service levels essentially requires efficient resource scheduling, which in turn requires accurate estimation of execution time.

Figure 11:
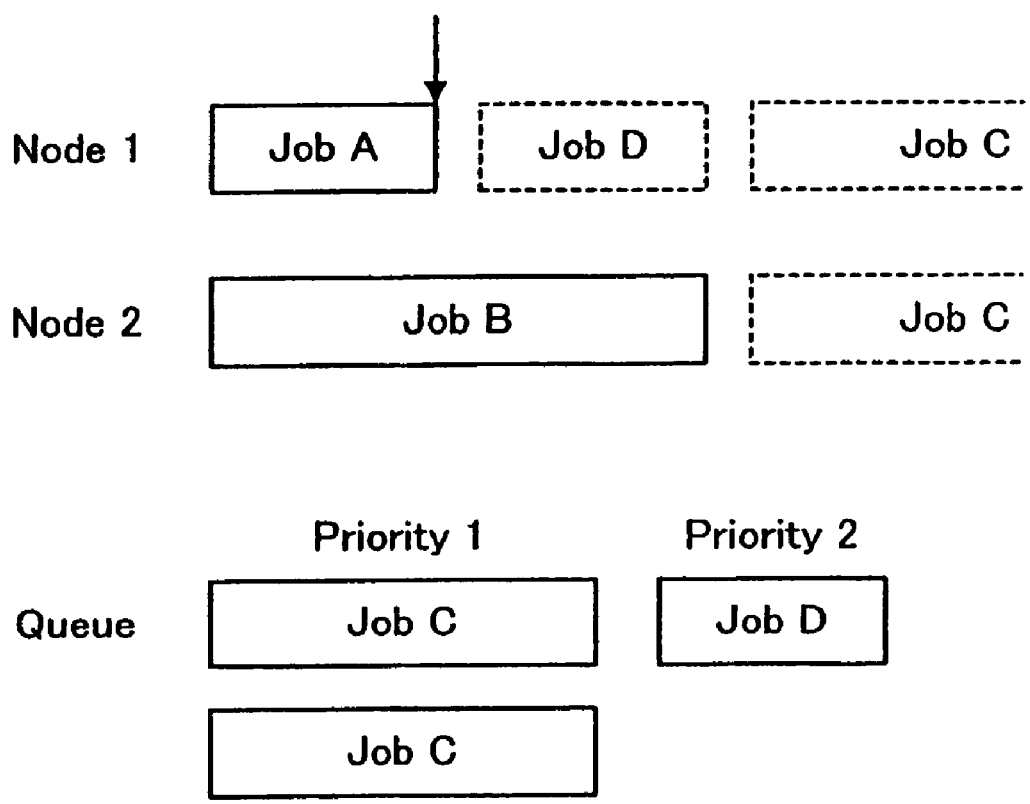
FIG. 11 is a diagram showing an example of two-node job assignment.

FIG. 11 shows an example of two-node job assignment. In this example, after Job A on Node 1 is finished, Job C which has the highest priority in the queue cannot be executed until Node 2 becomes available because it requires 2 nodes. Conventionally, Job D is run on Node 1 first, as indicated by the broken line, to improve overall efficiency. However, this works only if Job D is finished reliably as scheduled. If Job C goes on and on after Job B is finished, service level for the client of Job C will be lowered and Node 2 will be left idle, resulting in decreased system efficiency. Also, as described earlier, any erroneous report intended to deceive algorithms may impair the fairness of the entire system and results in loss of trust.

Generally, in resource scheduling, the following relationship holds in terms of resource utilization efficiency:
(a) online algorithm based on estimated computation time
   <(b) online algorithm based on accurate computation time
      <(c) online algorithm based on accurate computation time (optimal solution).

The (a) online algorithm based on estimated computation time is an algorithm which performs processing based only on information so far. The (c) online algorithm based on accurate computation time (optimal solution) is an algorithm which performs processing based on all information including future information. In other words, it can be seen that regardless of concrete implementation methods of algorithms, the efficiency of resource utilization can be improved by increasing the estimation accuracy of execution time and using longer-term future information.

The CPU resource provider 30 according to this embodiment obligates the application service provider 20 that is a client to report (send) estimated computation time (or an index of problem scale) when making a request, manages client profiles, and maintains history of reported times, actual wait times, actual execution times, etc. Also, based on the profiles, it analyzes the accuracy of computation time estimation and trends (bias) in reporting and uses the results for resource scheduling. It gives incentives for actions (accurate estimations or reservations by clients) that will help improve scheduling performance. Furthermore, it maintains the service level during contract time by adjusting priorities in assignment and adjusting parallelization based on the past history. Incidentally, however much scheduling performance may be improved, it is not possible to maintain service levels for all clients when loads are concentrated. Therefore, in case of any delay in processing, this embodiment maintains service levels and customer satisfaction, for example, by assigning nodes preferentially in the next time or assigning many nodes for speedy processing.

By means of the above configuration, this embodiment can implement fair service with guaranteed performance, improve the efficiency of resource utilization based on accurate estimation of computation time, and encourage clients to make accurate and honest estimates by giving incentives. Since jobs are not interactive, networks are less burdened; and thus are less region-dependent. This makes it possible to distribute loads using time differences, adding to merits of scale. Furthermore, new users of large computers can be attracted, resulting in an expanded market.

Besides, Web servers, for which the principal purpose of performance improvement is parallelization which enables heavy transaction processing, differ greatly in both hardware and software configurations from CPU servers which require a parallel computation environment, high-speed switches, etc. Providers can specialize in equipment configuration suitable for them by separating Web servers and CPU servers. Also, migration to a service business typically allows application service providers 20 to secure stable cash flow. Furthermore, the burden of user support such as version updates can be alleviated.

ADVANTAGES OF THE INVENTION

As described above, the present invention makes it possible to implement fair service with guaranteed performance in a system which provides processing services such as computation intensive processing services.

The invention claimed is:

1. A network system comprising:
a client for executing an application, the client comprising a computation time estimation section to estimate computation times for jobs associated with computational parts of the application; and
a CPU resource provider in communication with the client across a network to provide processing resources for executing the jobs communicated to the CPU resource provider by the client across the network during execution of the application by the client, the CPU resource provider comprising a job assigning unit to assigns said jobs by scheduling the processing resources based on the estimated computation times sent from the client to the CPU resource provider across the network, a profile storage unit comprising error information obtained from differences between a history of estimated job computation times sent to the CPU resource provider by the client and a log of actual job execution times and a correction unit in communication with the profile storage unit to correct the estimated computation times of the jobs communicated from the client to the CPU resource provider based on the error information;
wherein the client is an application service provider that provides the application based on a licensing contract with a user terminal connected to the network.

2. The network system according to claim 1, wherein the CPU resource provider further comprises a communications section to inform the client about the scheduling of the processing resources to handle jobs requested by the client.

3. A CPU resource provider that provides a processing service to an application executed by a client connected to a network, comprising:
a profile storage unit comprising error information obtained from differences between a history of estimated job computation times sent to the CPU resource provider by the client and a log of actual job execution times;
an estimated computation time receiving unit to receive estimated computation times for jobs requested by the client to handle computational parts of the application; and
a correction unit in communication with the profile storage unit and the estimated computation time receiving unit to correct the estimated computation times received by the estimated computation time receiving unit, based on the error information stored in said profile storage unit;

wherein the client is an application service provider that provides the application based on a licensing contract with a user terminal connected to the network.

4. The CPU resource provider according to claim 3, further comprising a job assigning unit to assign jobs by scheduling processing resources based on the estimated computation times send from the client as corrected by the correction unit.

5. The CPU resource provider according to claim 3, further comprising a node count determining unit to determine a current count of processing resource nodes available for assignment to the requested jobs.

* * * * *